(12) United States Patent
Kimura

(10) Patent No.: US 7,677,966 B2
(45) Date of Patent: Mar. 16, 2010

(54) GAME DEVICE

(75) Inventor: Seitaro Kimura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1382 days.

(21) Appl. No.: 10/670,573

(22) Filed: Sep. 26, 2003

(65) Prior Publication Data

US 2004/0063479 A1 Apr. 1, 2004

(30) Foreign Application Priority Data

Sep. 30, 2002 (JP) .............................. 2002-287649

(51) Int. Cl.
*A63F 9/24* (2006.01)
(52) U.S. Cl. ................... 463/1; 463/4; 700/90
(58) Field of Classification Search ............. 463/40–42, 463/1–4, 7, 9, 23; 700/90–93
See application file for complete search history.

(56) References Cited

U.S. PATENT DOCUMENTS

| 5,277,426 | A | | 1/1994 | Gerpheide et al. |
| 5,359,510 | A | * | 10/1994 | Sabaliauskas ................. 700/91 |
| 5,779,549 | A | * | 7/1998 | Walker et al. .................. 463/42 |
| 6,168,519 | B1 | * | 1/2001 | Nakagawa et al. ............. 463/4 |
| 6,758,754 | B1 | * | 7/2004 | Lavanchy et al. ............. 463/42 |

FOREIGN PATENT DOCUMENTS

| EP | 1 010 455 A1 | 6/2000 |
| JP | 07-98104 B2 | 10/1995 |
| JP | 2001-022264 A | 1/2001 |
| JP | 2002-08527 | 3/2002 |
| JP | 2002-239227 A | 8/2002 |

OTHER PUBLICATIONS

Softbank Publishing Inc., PC Supplement, OH! PC, May 1, 1999 (vol. 17, No. 13, p. 262).

* cited by examiner

*Primary Examiner*—Dmitry Suhol
*Assistant Examiner*—Robert Mosser
(74) *Attorney, Agent, or Firm*—Sughrue Mion, PLLC

(57) ABSTRACT

In order to output event content of a related match during execution of a main match, there is provided a virtual start time decider for deciding virtual start times for a plurality of matches, a related match selector for selecting, from the plurality of matches, at least one match, taking place at least partially at the same time as a main match a player's team is taking part in, as one or more matches related to the main match based on virtual start times for each match, a related match simulator for simulating the related matches, event storage unit for storing event time and event content for prescribed types of events occurring in the related matches, a main match executor for executing the main match, an event time arrival monitor for monitoring for arrival of the event time stored by the event storage unit during execution of the main match, and an event content output unit for outputting event content corresponding to the event time when it is determined that the event time has arrived during execution of the main match.

15 Claims, 8 Drawing Sheets

GAME DEVICE

BACKGROUND OF THE INVENTION

The present invention relates to a game device, program, and program distribution device.

Games such as various sports games etc. where a player replicates tournament format or league format match as a result of matches being provided that are automatically executed (simulated) by a computer such as a game machine etc. separately from matches in which a player's team is taking part are well known. For example, in the case of a football simulation game, a multiplicity of soccer teams other than the soccer team that is the player's team is provided. In a match in which a soccer team that is the player's team takes part (main match), game operations made by the player are received, while in other matches, match results are calculated as a result of simulations by computer on the game machine side.

However, with related games, match results are calculated merely through simple simulations and it was not possible to create an atmosphere that another match was taking place at the same time as the main match for the player. However, if it were to become possible to provide latest news bulletins etc. during a match for other matches related to the main match, then this may contribute to the tactics a player uses, and it is anticipated that this would serve to further heighten tension.

SUMMARY OF THE INVENTION

In order to resolve the aforementioned problems, an advantage of the present invention is to provide a game device, program, and distribution device capable of outputting event content during execution of a main match for a related match taking place at least partially at the same time as a main match a player's team is taking part in is being played.

In order to resolve the aforementioned problems, a game device of the present invention comprises virtual start time deciding means for deciding virtual start times for a plurality of matches, related match selection means for selecting at least one match, from the plurality of matches, taking place at least partially at the same time as a main match a player's team is taking part in as one or more matches related to the main match based on virtual start times for each match decided by the virtual start time deciding means, related match simulation means for simulating the one or more related matches, event storage means for storing event time and event content for prescribed types of events occurring in the one or more related matches, main match execution means for executing the main match, event time arrival monitoring means for monitoring for arrival of the event time stored by the event storage means during execution of the main match, and event content output means for outputting event content corresponding to the event time when it is determined by the event time arrival monitoring means that the event time has arrived during execution of the main match.

Further, an information storage medium of the present invention stores a program enabling a computer to function as virtual start time deciding means for deciding virtual start times for a plurality of matches; related match selection means for selecting at least one match, from the plurality of matches, taking place at least partially at the same time as a main match a player's team is taking part in as one or more matches related to the main match based on virtual start times for each match decided by the virtual start time deciding means, related match simulation means for simulating the one or more, event storage means for storing event time and event content for prescribed types of events occurring in the one or more, main match execution means for executing the main match, event time arrival monitoring means for monitoring for arrival of the event time stored by the event storage means during execution of the main match, and event content output means for outputting event content corresponding to the event time when it is determined by the event time arrival monitoring means that the event time has arrived during execution of the main match.

Moreover, a program distribution device of the present invention for reading and distributing a program comprises an information storage medium for storing the program enabling a computer to function as virtual start time deciding means for deciding virtual start times for a plurality of matches; related match selection means for selecting at least one match, from the plurality of matches, taking place at least partially at the same time as a main match a player's team is taking part in as one or more matches related to the main match based on virtual start times for each match decided by the virtual start time deciding means, related match simulation means for simulating the one or more, event storage means for storing event time and event content for prescribed types of events occurring in the one or more, main match execution means for executing the main match, event time arrival monitoring means for monitoring for arrival of the event time stored by the event storage means during execution of the main match, and event content output means for outputting event content corresponding to the event time when it is determined by the event time arrival monitoring means that the event time has arrived during execution of the main match. Here, the meaning of "distribution" may include both down load distribution and stream distribution.

According to the present invention, virtual start times are decided for a plurality of matches and matches relating to the main match are selected based on the virtual start times. A main match is the match of a plurality of matches that a player represented by, for example, a single entity of a sportsman, robot, automobile, or plane etc., or a team etc. takes part in. A related match is a match of the plurality of matches that takes place at least partially at the same time as the main match, i.e. a match that overlaps with the main match. A related match may be simulated by various computers such as, for example, a computer game system such as a household game etc., a server computer system, or a personal computer system etc. In the case of the occurrence of a prescribed type of event such as, for example, a scoring event, an event of substituting some or all of the players etc. of the player's team, an event of some or all of the players etc. of the player's team becoming injured etc., event time and event content are stored. On the other hand, the main match is executed based on, for example, input of the controller, etc. The arrival of the event time is monitored, and when it is determined that the event time has arrived during realization (execution) of the main match, event content corresponding to the event time is output through, for example, displaying, audio, vibration, or transmission, etc. According to the present invention, event times of a related match are outputted during execution of the main match and the appeal of the game is increased.

Further, in an aspect of the present invention, the event storage means stores replay data for reproducing and displaying prescribed types of events occurring in the related matches as event content, and the event content output means reproduces and displays prescribed types of events occurring in the related matches based on the replay data. As a result of doing this, prescribed types of events occurring in a related match are reproduced and displayed.

DETAILED DESCRIPTION OF THE PREFERRED EMBODIMENT

The following is a detailed description based on the drawings of an embodiment of the present invention.

Figure 1:
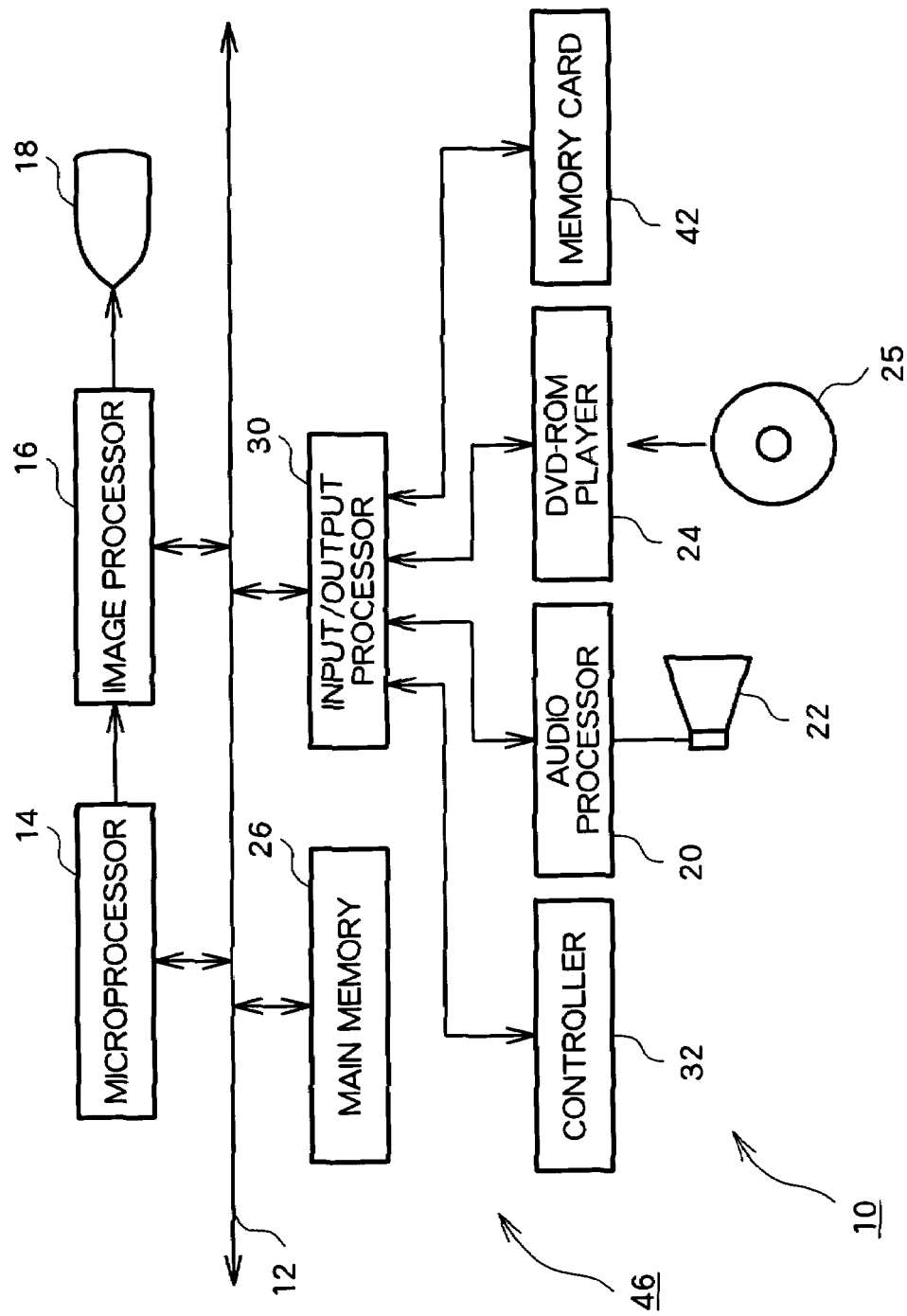
FIG. 1 is a view showing a hardware configuration for a game device of an embodiment of the present invention.

FIG. 1 is a view showing a hardware configuration for a game device of the first embodiment of the present invention. In FIG. 1, a game device 10 is implemented by installing a DVD-ROM 25 and a memory card 42 constituting information storage media in a household game 46 connected to a monitor 18 and a speaker 22. A household television is used as the monitor 18 with built-in speakers of the television used as the speakers 22. Further, a DVD-ROM 25 is used to supply the program to the household game 46 but any other information storage media such as CD-ROMs or ROM cards etc. may also be used. Moreover, as described in the following, the program may also be supplied to the household game 46 from a remote location via a data communication network such as the Internet, etc.

The household game 46 is a well-known computer game system including a microprocessor 14, image processor 16, main memory 26, input/output processor 30, audio processor 20, controller 32, and DVD-ROM player 24. The microprocessor 14, image processor 16, main memory 26, and input/output processor 30 are connected so as to be capable of mutual data communication using a bus 12, with the controller 32, audio processor 20, DVD-ROM player 24 and memory card 42 being connected to the input/output processor 30. Each structural element of the household game 46 other than the controller 32 is housed in a case.

The microprocessor 14 controls each part of the household game 46 based on an operating system contained in a ROM (not shown), a program read from the DVD-ROM 25, and saved data read from the memory card 42, and provides the game to the player. The bus 12 is for exchanging addresses and data with each part of the household game 46. The main memory 26, for example, has a configuration including RAM, which is written with programs read out from the DVD-ROM 25 and saved data read out from the memory card 42 as necessary. The main memory 26 can also be used in operations of the microprocessor 14. The image processor 16 has a configuration including VRAM. The image processor 16 receives image data sent from the microprocessor 14, depicts this as a game image on the VRAM, and converts this content to a video signal for output at the monitor 18.

The input/output processor 30 is an interface enabling the microprocessor 14 to access the controller 32, the audio processor 20, the DVD-ROM player 24, and the memory card 42. The audio processor 20 includes a sound buffer and reads out various audio data such as game music, game result sounds, and messages etc. from the DVD-ROM 25 and plays back these sounds from the speaker 22. The DVD-ROM player 24 reads programs recorded on the DVD-ROM 25 in accordance with instructions from the microprocessor 14. The controller 32 is a general-purpose operation input means for enabling a player to input various game operations. The memory 42 includes non-volatile memory (for example, EEPROM) and is detachable from the household game 46. Saved data for various games etc. is stored in the memory card 42.

Figure 2:
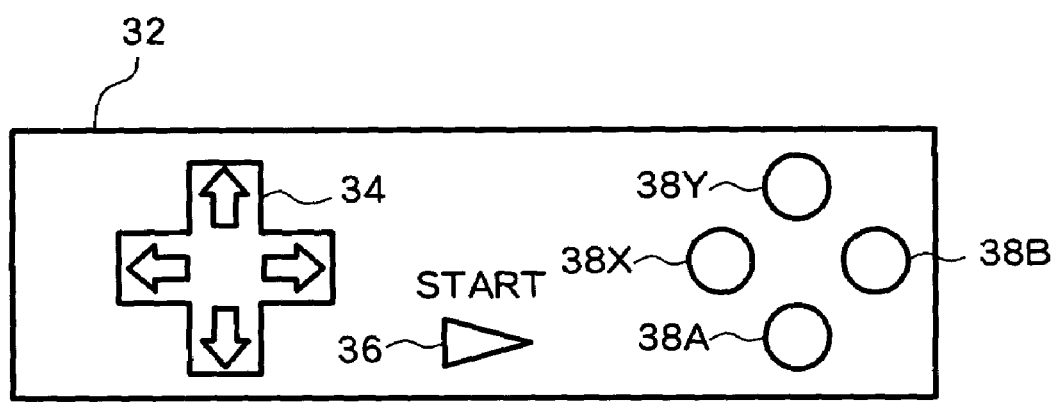
FIG. 2 shows an example of the controller.

FIG. 2 shows an example of the controller 32. The controller 32 shown in FIG. 2 is a general-purpose game controller, and as shown in FIG. 2, is provided with direction keys 34, a start button 36, and buttons 38×, 38Y, 38A and 38B. The direction key 34 has a cross-shape, and is usually used for designating the direction of movement of characters or a cursor. The start button 36 is a small, triangular, push-button, and is usually used for starting games or forcing a game to end. The buttons 38×, 38Y, 38A, 38B, 39L, 39R, 41L and 41R are used in other game operations. With the game described in the following (a football simulation game), the direction key 34 is used to make menu selections and the button 38B is used to decide choices.

In the following, a detailed description is given of the technology for implementing a soccer simulation game using this hardware configuration.

This soccer simulation game differs from usual soccer games in that the player is not a soccer player but rather takes on the role of a soccer manager. Namely, in this game, a player assumes the role of a prescribed manager entering a first tournament (league format or tournament format, etc.). After this, a player modifies their team according to the team performance, or other tournaments are entered so that finally the aim is to become number one in Japan or number one in the world. The characteristic point in this case is that if an event such as a goal or an injury occurs during a match or in another match that is taking place at the same time, the content of this event appears during the match which the player is playing. This means that event content such as "XX have scored in the match of YY versus XX!" or "player A from YY has been injured in the match of YY versus XX" etc. is displayed. This event content may be displayed in the corner of the monitor 18 in the form of a news flash or may be output as sound from the speaker 22 as, for example, a live broadcast.

Figure 3:
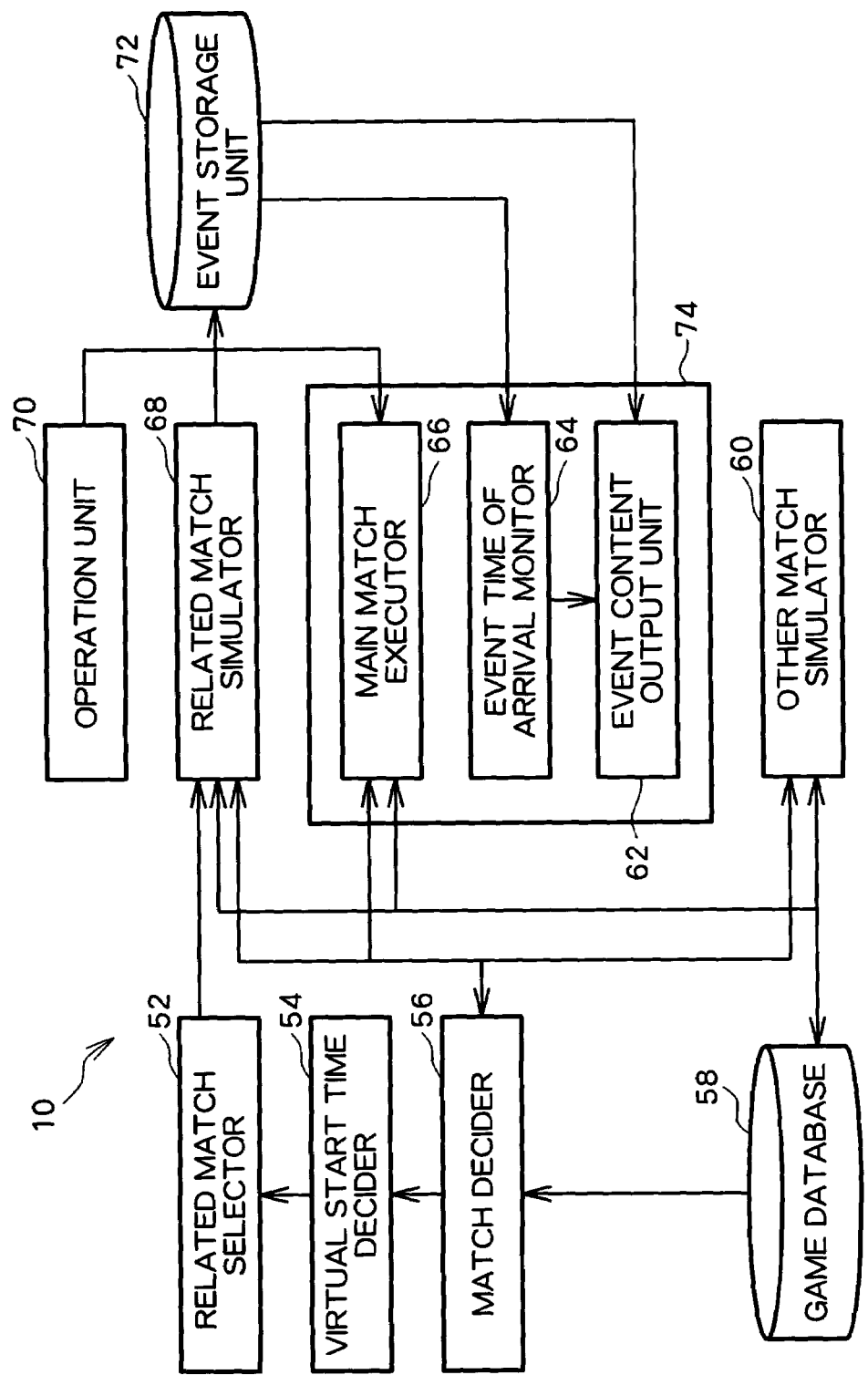
FIG. 3 is a block view showing functions of a game device of an embodiment of the present invention.

FIG. 3 is a functional block view of this game device 10. Each of the functions shown in FIG. 3 is realized as a result of programs stored in the DVD-ROM 25 being executed by the microprocessor 14. As shown in FIG. 3, the functions implemented by the game device 10 include a related match selector 52, a virtual start time decider 54, a match decider 56, a game database 58, an other match simulator 60, a main match unit 74, a related match simulator 68, an operation unit 70 and an event storage unit 72. The main match unit 74 carries out information processing relating to a match the soccer team that is the player's team is participating in and includes an event content output unit 62, an event time of arrival monitor 64 and a main match executor 66. These functional blocks are controlled by a control unit (not shown). This control unit is also realized as a result of programs stored in the DVD-ROM 25 being executed by the microprocessor 14.

Figure 4:
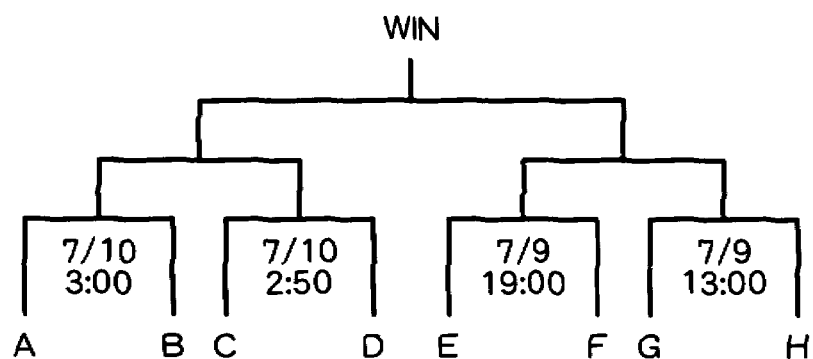
FIG. 4 is a view showing an example of a tournament tree (match information).

Further, the game database 58 is for storing current information relating to soccer teams and soccer stadiums prepared for the game space and is constructed from, for example, the main memory 26. The match decider 56 decides match cards based on soccer team information stored in the game database 58. The virtual start time decider 54 decides upon the times the games are held, i.e. the virtual start times, for each of the decided matches. FIG. 4 is a view showing items decided by the match decider 56 and the virtual start time decider 54. FIG. 4 shows an example of the match decider 56 deciding match cards in a tournament format, with A to H showing soccer teams, and the times showing the virtual start times. The match decider 56 receives match results from the main match executor 66, related match simulator 68, and the other match simulator 60, and decides the next matches card upon receiving the results of the matches.

The related match selector 52 chooses one or more matches from the match card that are taking place at least partially at the same time as the main match for the game space based on the virtual start times of each match decided by the virtual start time decider 54 and chooses part or all of these match/matches as the related match/matches. Here, the main match is the match that the player's team is taking part in. Further, the related match is a match card which has a strong relation to the player's team such as for a team which is close to the player's team in the standings or a team which is to play the player's team in the near future.

The operation unit 70 is constructed so as to include the controller 32 and is to enable the player to give instructions such as with regards to tactics, formation, and player substitutions etc. in the manner of the manger of a soccer team. The other match simulator 60 is for simulating each of the matches other than the main match and the related matches based on soccer team information (including soccer player information) stored in the game database 58. The related match simulator 68 is for simulating related matches based on soccer team information for the related match stored in the game database 58. This simulation may be a detailed simulation acting in virtual space for each player of both teams as a result of AI (Artificial Intelligence) or alternatively this may be a straightforward operation where, for example, just essential information such as match results etc. are calculated using parameters such as attacking strength and defensive strength for both teams. Contents of the game database 58 are then updated by these simulations as necessary. The event storage unit 72 stores event time/times and event content/contents for various prescribed events (events such as scoring or injury in this case) occurring in the related match/matches. The event time is virtual date and time information occurring in the game space.

Figure 5:
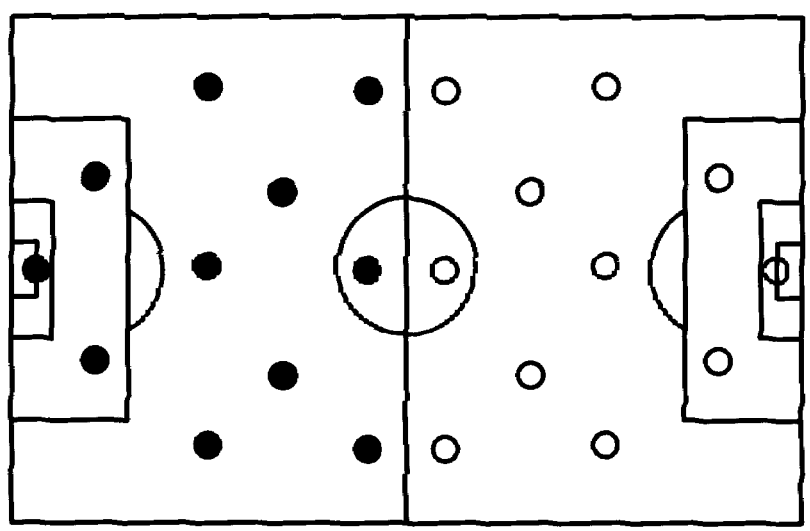
FIG. 5 is a view showing an example of a main match screen.

The main match executor 66 executes the main match in accordance with instructions from the player using the operation unit 70 based on soccer team information relating to the main match stored in the game database 58. FIG. 5 is a view showing an example screen displayed at the monitor 18 at the time of executing the main match. Further, during execution of the main match, the event time of arrival monitor 64 monitors for the arrival of the event time stored in the event storage unit 72. The related match, i.e. the event time for a match, the execution time of which overlaps with that of the main match, is stored in the event storage unit 72, with this event time arriving in a virtual manner during execution of the main game. In order to execute this monitoring, it is preferable for the date and time in the game space to be managed and updated in advance at the main match executor 66, and for the event time of arrival monitor 64 to monitor for the timing where this time coincides with the event time stored in the event storage unit 72. When it is determined by the event time of arrival monitor 64 that the event time of the related match has arrived during execution of the main match, the event content output unit 62 reads event content corresponding to the event time from the event storage unit 72 and outputs this content to the monitor 18 and the speaker 22. FIG. 5 shows an example of event content relating to an event occurring during a related match displayed in a window on the lower side of the match conditions of the main match.

Replay data for reproducing and displaying prescribed types of events occurring in the related match may be stored as event content in the event storage unit 72. If the event content output unit 62 then replays and displays the prescribed types of events occurring in the related match based on the replay data, the player can gain a more detailed understanding of the event content occurring for the related match.

Here, a description is given of the operation of the game device 10.

Figure 6:
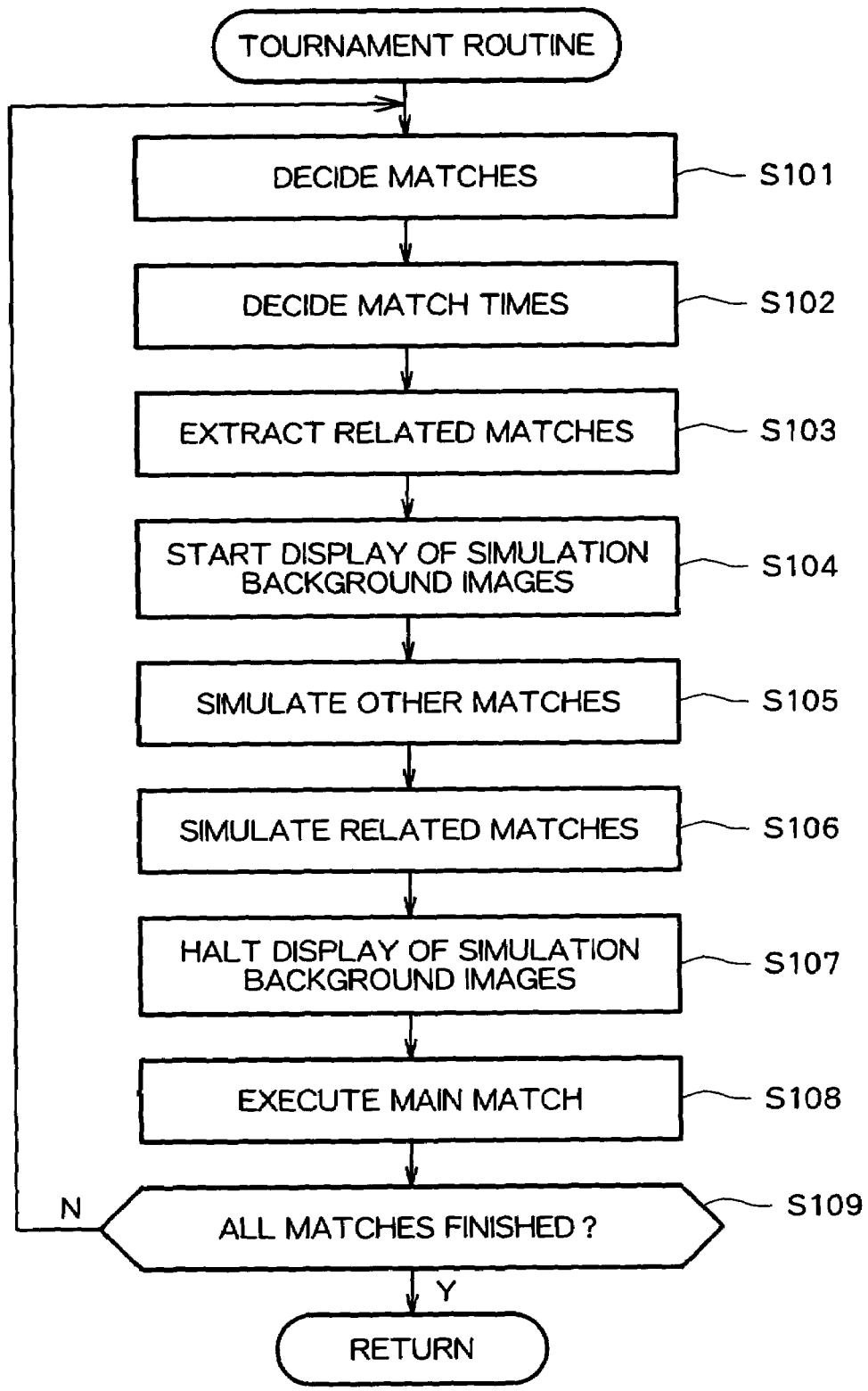
FIG. 6 is a flowchart showing a tournament routine.

FIG. 6 is a flowchart showing a tournament routine executed by the game device 10. The routine shown in FIG. 6 is executed when a player performs an instruction operation in order for, for example, the team that the player is managing to take part in a tournament based on the program stored in the DVD-ROM 25.

In this process, first, the match decider 56 adopts a match card (S101). The virtual start time decider 54 then decides the start times for each of the matches (S102). Further, the related match selector 52 extracts the related matches from the match cards that take place when the main match is taking place.

After this, a control unit (not shown) displays a simulation background image on the monitor 18 (S104). This image is displayed while the match simulation is being executed. It is also appropriate to output music etc. from the speaker 22 in line with the displaying of this image. Next, the other match simulator 60 then simulates other matches, i.e. simulates matches other than the main match and the related matches (S105). Further, the other match simulator 60 then simulates the related match (S106). At this time, the event time and event content are stored in the event storage unit 72 for events occurring due to scoring or injury in the related match. After this, displaying of the simulation background image started in S104 is halted (S107).

Next, the main match executor 66 executes the main match (S108). When the main match ends, a determination is made as to whether all of the match decided in S101 is finished, i.e. a determination is made as to whether a winning team has been decided (S109). If a winning team has not been decided, S101 is returned to and the process proceeds. In S101, from the second time onwards, the match results obtained in S105, S106 and S108 are reflected, and the next match cards are decided.

Figure 7:
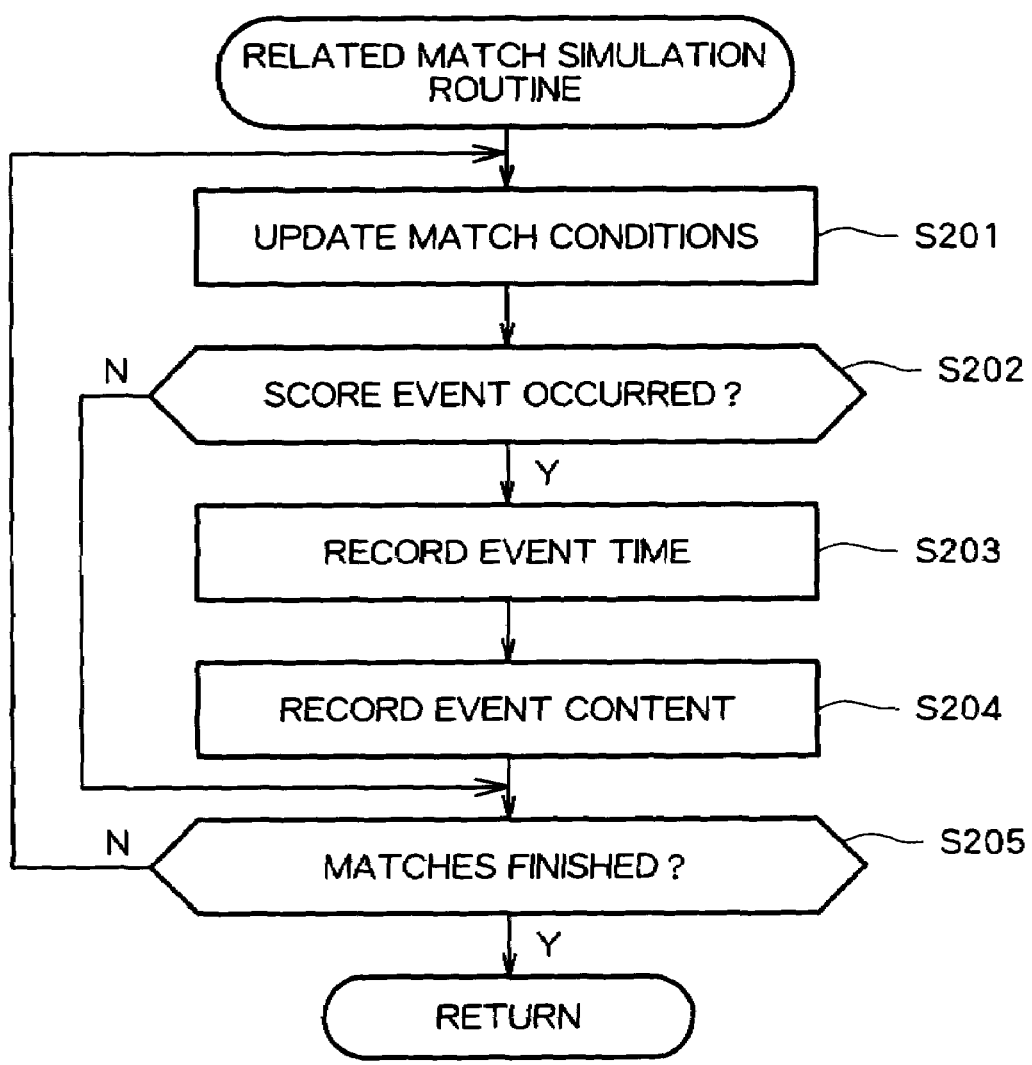
FIG. 7 is a flowchart showing a related match simulation routine.

FIG. 7 is a flowchart showing of the related match simulation process of the related match simulator 60. As shown in FIG. 7, in this process, first, match conditions are updated based on soccer team information for the teams stored in the game database 58. The match conditions include, for example, soccer player positions and ball position, etc. Next, when it is determined in step S201 that scoring event etc. has occurred (S202), this event time is stored in the event storage unit 72 (S203), and event content corresponding to this is stored in the event storage unit 72 (S204). If it is determined in S202 that a scoring event etc. has not occurred, the processing of S203 and S204 is skipped. The above process is then repeated until the end of the related match (until there is a match result) (S205).

Figure 8:
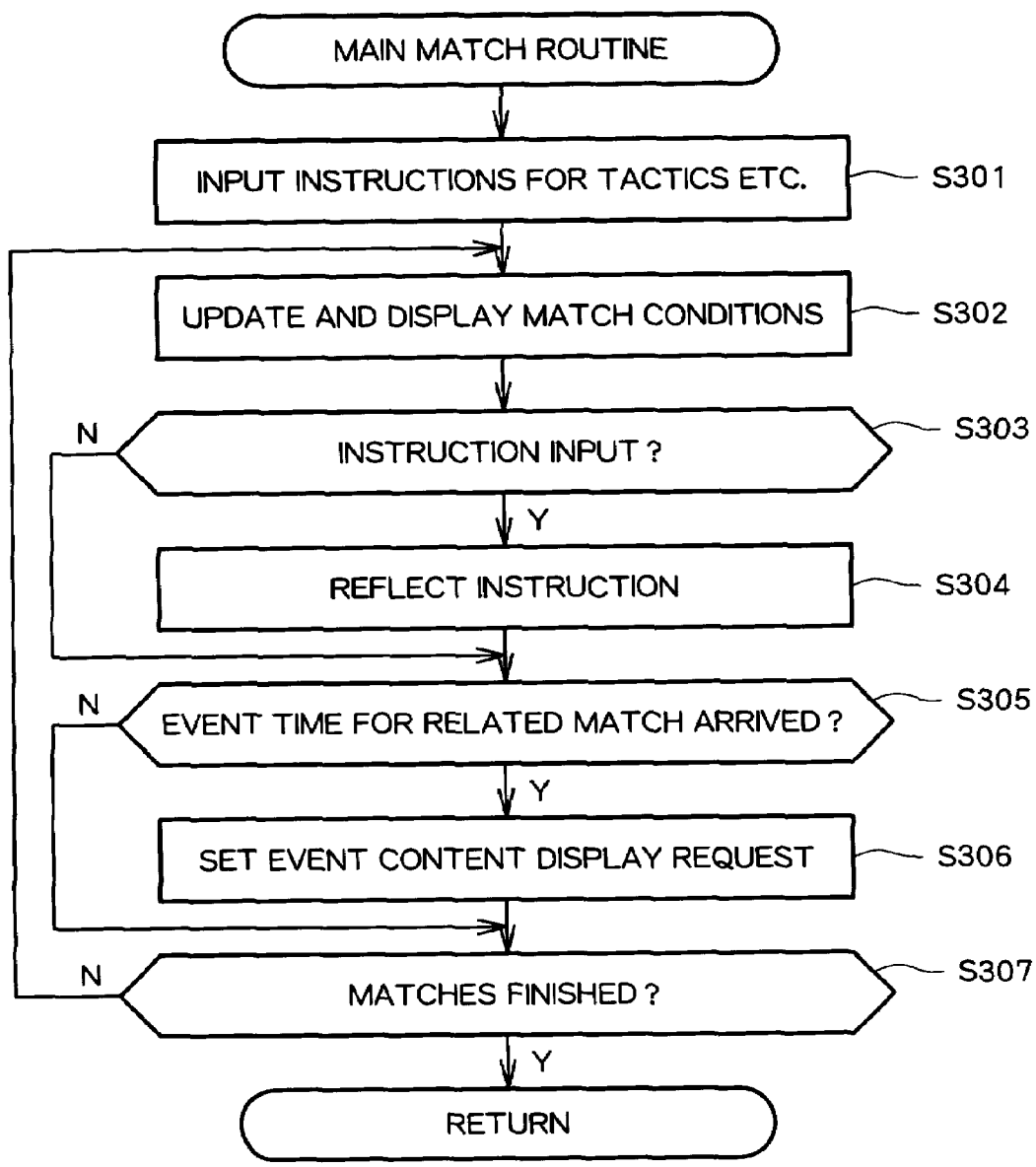
FIG. 8 is a flowchart showing a main match routine.

FIG. 8 is a flowchart showing main match processing by the main match unit 74. As shown in FIG. 8, in this process, first, the main match executor 66 receives tactics instructions etc. due to the operation unit 70 (S301). The match conditions are then updated based on soccer team information for both teams stored in the game database 58 and a match screen is displayed on the monitor 18 based on the match conditions after updating (S302). At this time, match sound is outputted from the speaker 22. The current time in game space is also included in the match conditions. A determination is then made as to whether or not there has been tactics instructions input during the match from the operation unit 70 (S303). If this is the case, this instruction is reflected in the game database 58 (S304). On the other hand, if there is no tactic instruction, the process in S304 is skipped.

Next, the event time of arrival monitor 64 reads the event time from the event storage unit 72 and makes a determination as to whether or not the event time and the current time updated in S302 coincide (S305). If the times coincide, it is determined that the event time for the related match has arrived, the event content output unit 62 reads out event content corresponding to the event time from the event storage unit 72, and stores it in the main memory 26 together with an output request for outputting this to the monitor 18, etc (S306). When it is determined in S305 that the event time and the current time do not coincide, the process of S306 is skipped.

The above process is then repeated until the end of the main match (until there is a match result) (S307). At this time, in S302, when the event content and output request are stored in the main memory 26 in S306, the event content (message) is output to the lower side of the match screen.

According to the game device described above, events occurring in a related match taking place at the same time in a game space while a main match is being executed can be outputted at any time and the tension involved in this kind of game can be increased.

The present invention is by no means limited to the above embodiment.

Figure 9:
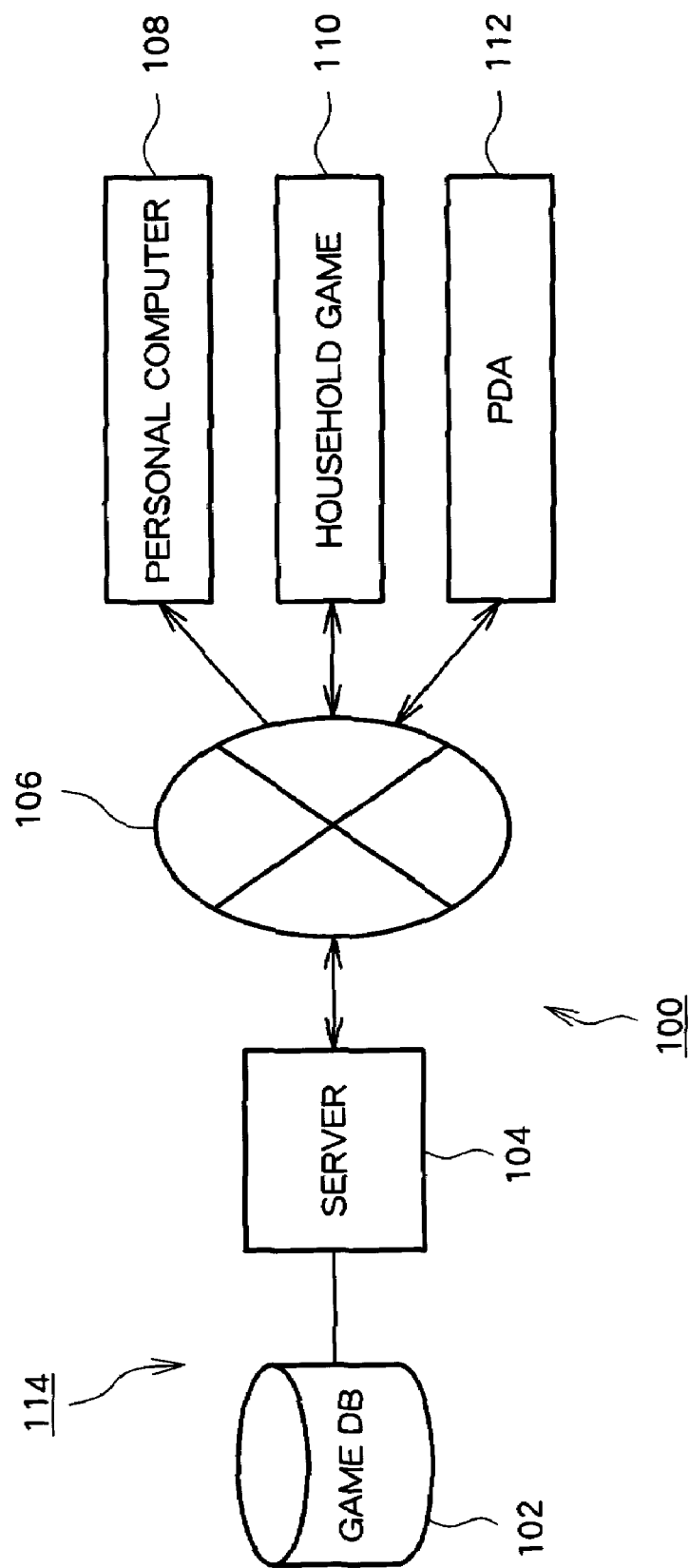
FIG. 9 is a view showing an overall configuration for a program distribution system of a further embodiment of the present invention.

For example, in the above description, a program is supplied from an information storage media of a DVD-ROM 25 to a household game 46 but the program can also be distributed to households etc. via a communication network. FIG. 9 is a view showing an overall configuration for a program distribution system using a communication network. As shown in FIG. 9, this program distribution system 100 includes a game database 102, server 104, communication network 106, personal computer 108, household game 110, and PDA (Personal Digital Assistant) 112. Of these, a program distribution device 114 is configured from the game database 102 (information storage media) and the server 104. The communication network 106 has a configuration of, for example, an Internet or a cable television network. With this system, the game database 102 is stored with a program similar to the content stored in the DVD-ROM 25. A customer then makes a game distribution request using the personal computer 108, household game 110, or PDA 112 etc., and this is transmitted to the server 104 via the communication network 106. The server 104 reads the program from the game database 102 in response to the game distribution request and this is sent to the origin of the game distribution request that is the personal computer 108, household game 110, or PDA 112 etc. Here, game distribution takes place in response to a game distribution request but transmission may also be one-way from the server 104. Further, it is by no means necessary for all of the program required for the implementation of the game to be distributed through a one-time download (en bloc distribution (download distribution)), and it is also possible to distribute necessary portions according to the phase of the game (streaming distribution). If game distribution via this kind of communication network 106 is adopted, then it is straightforward for the customer to acquire the program.

What is claimed is:

1. A game device comprising:
   virtual start time deciding means for deciding virtual start times for a plurality of matches, the virtual start times comprising an artificial time in a virtual game space;
   related match selection means for selecting at least one match, from the plurality of matches, taking place at least partially at the same virtual time as a main match a player's team is taking part in as one or more matches related to the main match based on virtual start times for each match decided by the virtual start time deciding means, the at least one selected match being different from the main match;
   related match simulation means for simulating the one or more related matches, the simulating of the one or more related matches performed without human player input;
   event storage means for storing event content and a virtual event time at which the event content occurs for prescribed types of events occurring in the one or more related matches;
   match decider means for deciding matches based upon information stored in a game database storage means;
   main match execution means for executing the main match;
   event time arrival monitoring means for monitoring arrival of the virtual event time stored by the event storage means during execution of the main match; and
   event content output means for outputting, during the executing of the main match, event content corresponding to the virtual event time if it is determined by the event time arrival monitoring means that the virtual event time has arrived during execution of the main match,
   wherein the related match simulation means simulates the one or more related matches prior to the main match executing means executing the main match, and
   wherein the match decider means receives match results from the main match execution means and related match simulation means for deciding a next plurality of matches.

2. The game device of claim 1, wherein the event storage means stores replay data for reproducing and displaying prescribed types of events occurring in the one or more related matches as the event content; and
   the event content output means reproduces and displays prescribed types of events occurring in the one or more related matches based on the replay data.

3. The game device of claim 1, further comprising:
   game database storage means for storing information prepared for a virtual game space.

4. The game device of claim 3, wherein the main match execution means receives instructions from a player for executing the main match based on information stored in the game database storage means.

5. The game device of claim 1, wherein the one or more related matches includes at least one of a team that is close to the player's team in a standings or a team that the player's team plays in a future match.

6. The game device of claim 1, wherein the virtual start time comprises a virtual date having at least one of a month value and a day value and a virtual time.

7. The game device of claim 1, wherein the virtual start times include at least one of an hour value and a minute value.

8. The game device of claim 1, wherein the event content output means outputs to the main match the event content occurring at the virtual event time, the event content being output at the virtual event time at which the event content occurs during the execution of the main match.

9. The game device of claim 1, wherein the related match simulation means for simulating the one or more related matches simulates the one or more related matches without the player's input based on at least one of artificial intelligence and a computational algorithm for determining an outcome of the one or more related matches, and wherein the main match execution means for executing the main match executes the main match based on instructions input by the player.

10. An information storage medium for storing a program enabling a computer to function as:

virtual start time deciding means for deciding virtual start times for a plurality of matches, the virtual start times comprising an artificial time in a virtual game space;

related match selection means for selecting at least one match, from the plurality of matches, taking place at least partially at the same virtual time as a main match a player's team is taking part in as one or more matches related to the main match based on virtual start times for each match decided by the virtual staff time deciding means, the at least one selected match being different from the main match;

related match simulation means for simulating the one or more related matches, the simulating of the one or more related matches performed without human player input;

event storage means for storing and event content and a virtual event time at which the event content occurs for prescribed types of events occurring in the one or more;

match decider means for deciding matches based upon information stored in a game database storage means;

main match execution means for executing the main match;

event time arrival monitoring means for monitoring arrival of the virtual event time stored by the event storage means during execution of the main match; and event content output means for outputting, during the executing of the main match, event content corresponding to the virtual event time if it is determined by the event time arrival monitoring means that the virtual event time has arrived during execution of the main match, wherein the related match simulation means simulates the one or more related matches prior to the main match executing means executing the main match and wherein the match decider means receives match results from the main match execution means and related match simulation means for deciding a next plurality of matches.

11. The information storage medium of claim 10, wherein the event content output means outputs to the main match the event content occurring at the virtual event time, the event content being output at the virtual event time at which the event content occurs during the execution of the main match.

12. The information storage medium of claim 10, wherein the related match simulation means for simulating the one or more related matches simulates the one or more related matches without the player's input based on at least one of artificial intelligence and a computational algorithm for determining an outcome of the one or more related matches, and wherein the main match execution means for executing the main match executes the main match based on instructions input by the player.

13. A program distribution device for reading and distributing a program, comprising an information storage medium for storing the program enabling a computer to function as:

virtual start time deciding means for deciding virtual start times for a plurality of matches, the virtual start times comprising an artificial time in a virtual game space;

related match selection means for selecting at least one match, from the plurality of matches, taking place at least partially at the same virtual time as a main match a player's team is taking part in as one or more matches related to the main match based on virtual start times for each match decided by the virtual staff time deciding means, the at least one selected match being different from the main match;

related match simulation means for simulating the one or more related matches, the simulating of the one or more related matches performed without human player input;

event storage means for storing event content and a virtual event time at which the event content occurs for prescribed types of events occurring in the one or more;

match decider means for deciding matches based upon information stored in a game database storage means;

main match execution means for executing the main match;

event time arrival monitoring means for monitoring arrival of the virtual event time stored by the event storage means during execution of the main match; and event content output means for outputting, during the executing of the main match, the event content corresponding to the virtual event time if it is determined by the event time arrival monitoring means that the virtual event time has arrived during execution of the main match, wherein the related match simulation means simulates the one or more related matches prior to the main match executing means executing the main match, and wherein the match decider means receives match results from the main match execution means and related match simulation means for deciding a next plurality of matches.

14. The program distribution device of claim 13, wherein the event content output means outputs to the main match the event content occurring at the virtual event time, the event content being output at the virtual event time at which the event content occurs during the execution of the main match.

15. The program distribution device of claim 13, wherein the related match simulation means for simulating the one or more related matches simulates the one or more related matches without the player's input based on at least one of artificial intelligence and a computational algorithm for determining an outcome of the one or more related matches, and wherein the main match execution means for executing the main match executes the main match based on instructions input by the player.

* * * * *